United States Patent
Taube et al.

(10) Patent No.: US 11,020,720 B2
(45) Date of Patent: Jun. 1, 2021

(54) METHOD FOR CLEANING PHOSGENE-CONDUCTING APPARATUSES

(71) Applicants: Covestro Deutschland AG, Leverkusen (DE); Zhangyong Ming, Shanghai (CN)

(72) Inventors: Wolfgang Taube, Neuss (DE); Zhangyong Ming, Shanghai (CN); Yiming Mao, Shanghai (CN); Yuguo Gai, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/641,695

(22) PCT Filed: Sep. 3, 2018

(86) PCT No.: PCT/EP2018/073596
§ 371 (c)(1),
(2) Date: Feb. 25, 2020

(87) PCT Pub. No.: WO2019/048371
PCT Pub. Date: Mar. 14, 2019

(65) Prior Publication Data
US 2020/0222871 A1  Jul. 16, 2020

(30) Foreign Application Priority Data

Sep. 6, 2017 (WO) ................. PCT/CN2017/100728
Nov. 20, 2017 (EP) ..................................... 17202500

(51) Int. Cl.
*B01J 8/02* (2006.01)
*C01B 32/80* (2017.01)
*B08B 7/04* (2006.01)

(52) U.S. Cl.
CPC ............... *B01J 8/0278* (2013.01); *B08B 7/04* (2013.01); *B01J 2208/0007* (2013.01); *B01J 2208/00707* (2013.01); *B01J 2208/00805* (2013.01); *B01J 2208/00946* (2013.01); *B08B 2205/00* (2013.01); *C01B 32/80* (2017.08)

(58) Field of Classification Search
CPC .............. B01J 8/0278; B01J 2208/0007; B01J 2208/00707; B01J 2208/00805; B01J 2208/00946; B01J 2208/021; C01B 32/80; B08B 7/04; B08B 9/0328; B08B 2205/00
See application file for complete search history.

(56) References Cited

U.S. PATENT DOCUMENTS 4,064,218 A  12/1977 Scholz et al.
2017/0096389 A1  4/2017 Knauf et al.

FOREIGN PATENT DOCUMENTS

WO  2016109987 A1  7/2016

OTHER PUBLICATIONS

"Phosgene Safety Practices for design, production and processing", International Isocyanate Institute Inc., 2012 edition, part 2, point 3.2.3.
"Phosgene Safe Practice Guidelines", American Chemical Council, 2014 version in chapter 9.0 ("Equipment Cleaning and Repair").
International Search Report, PCT/EP2018/073596, dated Feb. 1, 2019, Authorized officer: Andrea Pasanisi.

*Primary Examiner* — Lessanework Seifu
(74) *Attorney, Agent, or Firm* — Donald R. Palladino

(57) ABSTRACT

The invention relates to a method for cleaning a phosgene-conducting apparatus by pressurization with ammonia gas to constant pressure. In this way, phosgene residues in the apparatus to be cleaned are decomposed effectively.

18 Claims, No Drawings

METHOD FOR CLEANING PHOSGENE-CONDUCTING APPARATUSES

CROSS-REFERENCE TO RELATED APPLICATION

This application is a national stage application under 35 U.S.C. § 371 of PCT/EP2018/073596, filed Sep. 3, 2018, which claims the benefit of European Application No. 17202500.9, filed Nov. 20, 2017 and PCT/CN2017/100728, filed Sep. 6, 2017, each of which is incorporated herein by reference.

FIELD

The invention relates to a method for cleaning a phosgene-conducting apparatus by pressurization with ammonia gas to constant pressure. In this way, phosgene residues in the apparatus to be cleaned are decomposed effectively.

BACKGROUND

Phosgene is employed in many fields of chemistry, either as auxiliary or as intermediate. The largest field of use in terms of quantity is the preparation of diisocyanates and/or polyisocyanates as starting materials for polyurethane chemistry. In particular mention may be made here of tolylene diisocyanate (in particular meta-tolylene diisocyanate), naphthalene diisocyanate (in particular naphthalene 1,5-diisocyanate), pentane 1,5-diisocyanate, hexamethylene 1,6-diisocyanate, isophorone diisocyanate, diisocyanatodicyclohexylmethane, xylylene diisocyanate (in particular xylylene 1,3-diisocyanate and/or 1,4-diisocyanate) and the diamines and polyamines of the diphenylmethane series. A further important field of use for phosgene is the preparation of polycarbonates.

The production plants for producing such materials naturally comprise numerous phosgene-conducting apparatuses, for example reactors for the preparation of phosgene or reactors for reacting phosgene with appropriate reactive starting materials such as amines or phenols. Furthermore, numerous work-up apparatuses such as distillation columns are considered to be phosgene-conducting apparatuses. The same naturally also applies to numerous peripheral equipment such as tanks and pipes.

In all cases, it can be necessary to open such apparatuses, for example for maintenance, repair and cleaning work or in order to, for example, remove exhausted catalysts from a reactor. Due to the high toxicity of phosgene, it has for many decades been part of good industrial practice to free such apparatuses of phosgene very carefully before opening. Instructions on the subject which are customary in industry are known to those skilled in the art. Mention may be made by way of example of "Phosgene Safety Practices for design, production and processing" of the International Isocyanate Institute Inc. In the 2012 edition, a procedure which comprises, inter alia, flushing of the apparatus with nitrogen, flushing of the apparatus with ammonia and flooding of the apparatus with water, sodium hydroxide solution or aqueous ammonia is described in part 2 under item 3.2.3. Reference may likewise be made to the "Phosgene Safe Practice Guidelines" of the American Chemical Council. There, it is disclosed in the 2014 version in chapter 9.0 ("Equipment Cleaning and Repair") that difficult-to-clean apparatuses can be freed of phosgene using, inter alia, anhydrous ammonia.

Phosgene is usually prepared by reaction of carbon monoxide and chlorine over an activated carbon catalyst. Before a reactor used for this purpose can be opened, it has to be ensured that the activated carbon present therein has also been freed of phosgene, which owing to the large internal surface area has to be carried out very carefully. This problem is addressed by the International Patent Application WO 2016/109987 A1, which is directed to a method for rapidly freeing a phosgene production column of phosgene. This method comprises, after shutting off the introduction of the starting materials carbon monoxide and chlorine, firstly a step A) of flushing with nitrogen in order to drive the major part of the phosgene from the reactor. This is optionally followed by a step B) in which ammonia gas is introduced into the phosgene production column (whose outlet opening is now closed) until a pressure in the range from 0.11 MPa to 5 MPa has been established. After from 1 hour to 10 hours, the system is depressurized by opening the outlet opening of the phosgene production column. This procedure of pressurization with ammonia and depressurization is repeated a number of times if necessary. It is said that in this way firstly blocking of the downstream piping is prevented and secondly phosgene present in the pores of the activated carbon catalyst is also fully reacted. This optional step B) is followed by a step C) of passing ammonia gas through the phosgene production column. This step is carried out until the phosgene content measured in the outlet of the phosgene production column drops to a value of not more than 1 ppm. The success of phosgene decomposition is thus accordingly checked only by the analysis of the residual phosgene content. The application also discloses, in the case of a shell-and-tube reactor being used for phosgene production, cleaning of the reactor with water after taking out the activated carbon.

The checking of the success of phosgene decomposition solely by sampling and analysis of the residual phosgene content in the decomposition of phosgene using only gaseous ammonia is, however, not uncritical since it cannot be ruled out that hidden phosgene residues are missed thereby.

SUMMARY

There was therefore a need for further improvements in the field of cleaning, i.e. in particular in the freeing of phosgene-conducting apparatuses of phosgene. It would be particularly desirable to be able to establish in a simple way when the cleaning procedure, i.e. in particular the decomposition of residual phosgene, is concluded and the apparatus can be opened safely. In particular, it would be desirable to achieve a further improvement in the intrinsically attractive phosgene decomposition using gaseous ammonia.

Taking into account this need, the present invention provides a method for cleaning a phosgene-conducting apparatus which has at least one feed conduit which can be shut off and at least one discharge conduit which can be shut off, comprising the steps:

a) lowering the pressure in the apparatus to be cleaned to a value of less than or equal to 900 $mbar_{(abs.)}$, preferably less than or equal to 500 $mbar_{(abs.)}$, particularly preferably less than or equal to 100 $mbar_{(abs.)}$, even more preferably less than or equal to 50 $mbar_{(abs.)}$, most preferred less than or equal to 25 $mbar_{(abs.)}$;

b) shutting off all conduits connected to the apparatus to be cleaned with the exception of at least one feed conduit for ammonia gas;

c) introducing gaseous ammonia from an ammonia gas source through the at least one feed conduit which has not been shut off until a predetermined pressure of greater than or equal to 1.01 bar$_{(abs.)}$, in particular in the range from 1.01 bar$_{(abs.)}$ to 5.00 bar$_{(abs.)}$, has built up in the apparatus to be cleaned;

d) measuring the pressure in the apparatus to be cleaned, continuously or at intervals of at most 1 hour, and, as soon as the pressure drops by more than 5.0% below the predetermined value, bringing the pressure back to the predetermined value (or to a value deviating at most ±2.0% from the predetermined value) by introducing further gaseous ammonia;

e) as soon as the pressure in the apparatus to be cleaned remains in a fluctuation range of ±5.0% around the predetermined value, for a period of more than 1.0 hour, preferably at least 6.0 hours, particularly preferably at least 12.0 hours, even more preferably at least 24.0 hours, separating the ammonia gas source from the apparatus to be cleaned, optionally, lowering the pressure in the apparatus, preferably to a value of from 900 mbar$_{(abs.)}$ to 1000 mbar$_{(abs.)}$, releasing the shutting-off of at least one discharge conduit, followed by passing an inert gas through the apparatus to be cleaned.

DETAILED DESCRIPTION

For the purposes of the invention, "phosgene-conducting apparatuses" are all plant parts which come into contact with phosgene during operation, i.e., in particular, reactors for the preparation of phosgene, reactors for reacting phosgene with a reactive starting material, work-up apparatuses for purifying products which have been produced using phosgene (in particular distillation columns) and also peripheral equipment such as pipes and containers (e.g. tanks).

A brief summary of various possible embodiments of the invention firstly follows: In a first embodiment of the invention, which can be combined with all other embodiments, step a) is preceded by the following step:

aa) passing carbon monoxide through the apparatus to be cleaned.

In a second embodiment of the invention, which can be combined with all other embodiments, in particular with the first embodiment, the following step:

ab) passing an inert gas through the apparatus to be cleaned, is carried out before step a), in particular, when step aa) is carried out, after step aa) and before step a).

In a third embodiment of the invention, which can be combined with all other embodiments, the apparatus to be cleaned is brought to a temperature in the range from 60.0° C. to 140.0° C. during step aa), if carried out, and/or during step ab), if carried out, and/or during step a).

In a fourth embodiment of the invention, which can be combined with all other embodiments, the apparatus to be cleaned is brought to a temperature in the range from 50.0° C. to 80.0° C. during steps c) and d).

In a fifth embodiment of the invention, which can be combined with all other embodiments, step e) is followed by the following further step:

f) passing an aqueous stream, in particular passing water or aqueous ammonia, through the apparatus to be cleaned, followed by drying by passing air or an inert gas through.

In a sixth embodiment of the invention, which represents an alternative to the fifth embodiment but can otherwise be combined with all other embodiments, the apparatus to be cleaned is, after step e), either opened or taken into operation without an aqueous stream being passed through the apparatus to be cleaned before opening or taking into operation.

In a seventh embodiment of the invention, which can be combined with all other embodiments, the apparatus to be cleaned is selected from among reactors for preparing phosgene, reactors for reacting phosgene with a reactive starting material, work-up apparatuses for purifying products which have been produced using phosgene and peripheral equipment such as, in particular, pipes and containers.

In an eighth embodiment of the invention, which is a particular variant of the seventh embodiment, the apparatus to be cleaned is a reactor filled with activated carbon for preparing phosgene from carbon monoxide and chlorine.

In a ninth embodiment of the invention, which is a particular variant of the eighth embodiment, the reactor filled with activated carbon for preparing phosgene from carbon monoxide and chlorine is part of a production plant for preparing a chemical product by reacting a phosgene-reactive starting material with phosgene.

In a tenth embodiment of the invention, which is a particular variant of the ninth embodiment, the phosgene-reactive starting material is a compound having two or more phenolic hydroxy groups or a compound having two or more primary amino groups.

In an eleventh embodiment of the invention, which is a particular variant of the ninth or tenth embodiment, the production plant for preparing a chemical product has n reactors for preparing phosgene from carbon monoxide and chlorine which are filled with activated carbon and can be regulated independently of one another, where n is a natural number from 2 to 10, preferably from 2 to 5, with phosgene being prepared from carbon monoxide and chlorine in m reactors, where m is a natural number in the range from 1 to n−1, while the cleaning steps aa), optionally ab), and a) to e) are carried out in at least one reactor.

In a twelfth embodiment of the invention, which can be combined with all embodiments comprising step aa) and can in particular be combined with the eleventh embodiment, the carbon monoxide-containing gas leaving the apparatus to be cleaned in step aa) is fed to a process for preparing phosgene from carbon monoxide and chlorine, in particular for preparing phosgene from carbon monoxide and chlorine in the m reactors.

In a thirteenth embodiment of the invention, which can be combined with all embodiments in which the apparatus to be cleaned is a reactor filled with activated carbon for preparing phosgene from carbon monoxide and chlorine, step e) or, if carried out, step f) is followed by the following step:

g) removing the activated carbon and replacing it by fresh activated carbon.

In a fourteenth embodiment, which can be combined with all other embodiments, the predetermined pressure in step c) is in the range from 1.02 bar$_{(abs.)}$ to 4.00 bar$_{(abs.)}$, preferably in the range from 1.05 bar$_{(abs.)}$ to 4.00 bar$_{(abs.)}$, particularly preferably in the range from 1.10 bar$_{(abs.)}$ to 3.00 bar$_{(abs.)}$, very particularly preferably in the range from 1.20 bar$_{(abs.)}$ to 1.50 bar$_{(abs.)}$.

The embodiments which have been briefly indicated above and further possible variants of the invention are explained in more detail in the following. Various embodiments can, unless the context clearly indicates the opposite to a person skilled in the art, be combined with one another in any way.

Before the method of the invention is carried out, it is of course necessary to interrupt the introduction of the starting materials normally fed into the apparatus to be cleaned (in the case of a phosgene production reactor, carbon monoxide and chlorine, and in the case of a reactor for the phosgenation of isocyanates, amine and phosgene, etc.) and if required to drain off any liquid present (e.g. reaction solution). The apparatus may also be flushed with a solvent and/or with an inert gas such as those described below in the context of step ab).

In step a) of the method of the invention, the pressure in the apparatus to be cleaned is then lowered. In principle, it is desirable to lower the pressure at this stage as far as possible, i.e. to evacuate the apparatus as far as technically feasible. However, depending on the equipment available in a production plant, it may only be possible to reduce the pressure slightly below atmospheric pressure without exercising undue efforts. In such cases, it is sufficient to reduce the pressure to a value of 900 mbar$_{(abs.)}$; albeit, however, at the cost of higher ammonia gas consumption later in the process.

Lowering the pressure in step a) can be carried out using all vacuum generating devices with which a person skilled in the art will be familiar. Step a) serves to remove the main part of the phosgene still present in the apparatus. The offgas of the vacuum generating device is preferably fed into an offgas work-up comprising a decomposition of phosgene by means of water over activated carbon.

In one embodiment of the invention, carbon monoxide is passed through the apparatus to be cleaned in a step aa) before step a). Carrying out step aa) is particularly preferred when the apparatus to be cleaned is a reactor containing a catalyst having a large internal surface area (in particular activated carbon). The carbon monoxide introduced serves to desorb phosgene and possibly chlorine present in the pores of the catalyst. The gas mixture leaving the apparatus to be cleaned can be fed to an offgas work-up comprising a decomposition of phosgene by means of water over activated carbon or be used in the preparation of fresh phosgene. In step aa), carbon monoxide is preferably passed through for a period of from 1.0 hour to 168 hours, particularly preferably from 8.0 hours to 120 hours, very particularly preferably from 12.0 hours to 72 hours and extraordinarily very particularly preferably from 18 hours to 48 hours.

The method of the invention can also comprise a step ab) in which an inert gas is passed through the apparatus to be cleaned. A suitable inert gas is, in particular, nitrogen, carbon dioxide or a noble gas such as argon or helium. Preference is given to using nitrogen. Step ab) is particularly preferred when step aa) is carried out and in that case this is preferably followed by step ab). In this particularly preferred embodiment, the carbon monoxide is flushed by means of the step ab) out of the apparatus to be cleaned. The gas mixture leaving the apparatus to be cleaned is preferably fed to an offgas work-up comprising a decomposition of phosgene by means of water over activated carbon. In step ab), the inert gas is preferably passed through for a period of from 1.0 hour to 120 hours, particularly preferably from 3.0 hours to 72 hours, very particularly preferably from 6.0 hours to 48 hours and extraordinarily very particularly preferably from 12 hours to 24 hours.

In step aa) and step ab), preference is given, independently of one another, to bringing the apparatus to be cleaned to a temperature in the range from 60.0° C. to 140.0° C., preferably in the range from 80.0° C. to 120.0° C. In step a) itself, a temperature in this range is preferably also maintained; particular preference is given to maintaining the same temperature in step aa), step ab) and step a).

In step b), all conduits connected to the apparatus to be cleaned are, if this has not yet occurred for carrying out step a), then shut off except for at least one, preferably precisely one, ammonia gas feed conduit. The expression "all conduits connected to the apparatus to be cleaned" means the feed and discharge conduits for the starting materials introduced into the apparatus to be cleaned during normal operation and the products taken off therefrom; safety devices such as overpressure valves are not encompassed thereby. These feed and discharge conduits are normally provided with valves which are closed in step b).

In step c), the apparatus which has been evacuated and shut off except for the ammonia gas feed conduit(s) is then flooded with ammonia gas until a predetermined pressure of greater than or equal to 1.01 bar$_{(abs.)}$, in particular in the range from 1.01 bar$_{(abs.)}$ to 5.00 bar$_{(abs.)}$, preferably in the range from 1.02 bar$_{(abs.)}$ to 4.00 bar$_{(abs.)}$, particularly preferably in the range from 1.05 bar$_{(abs.)}$ to 4.00 bar$_{(abs.)}$, very particularly preferably in the range from 1.10 bar$_{(abs.)}$ to 3.00 bar$_{(abs.)}$, extraordinarily very particularly preferably in the range from 1.20 bar$_{(abs.)}$ to 1.50 bar$_{(abs.)}$, has built up. The "predetermined pressure" can be any pressure within the ranges mentioned, for example 1.01 bar$_{(abs.)}$, 1.05 bar$_{(abs.)}$, 1.50 bar$_{(abs.)}$, 2.00 bar$_{(abs.)}$, 2.50 bar$_{(abs.)}$, 3.00 bar$_{(abs.)}$, 3.50 bar$_{(abs.)}$, 4.00 bar$_{(abs.)}$, 4.50 bar$_{(abs.)}$ or 5.00 bar$_{(abs.)}$. In a preferred embodiment of the invention, the apparatus to be cleaned is brought to a temperature in the range from 50.0° C. to 80.0° C. in step c).

The pressure in the apparatus to be cleaned is measured continuously ("on-line") or at intervals (at least 1× per hour, preferably 1× per half hour, particularly preferably 1× per quarter hour) (step d)). For this purpose, a pressure measuring device (in particular a pressure transmitter) is installed on the apparatus to be cleaned or an existing pressure measuring device (for example in a discharge conduit of the apparatus to be cleaned upstream of the closure valve) is used. Those skilled in the art are well aware of the fact that the pressure in an apparatus depends on the temperature. If the temperature of the apparatus to be cleaned is kept constant during step d), for example by means of an external heating set to a predetermined temperature (such as the temperature chosen for step c)), this has no practical consequences for the inventive process. If the temperature in the apparatus is not regulated and is consequently dependent on ambient temperature, the pressure that is measured in step d) continuously or at intervals of at least 1× per hour may be misleading. For example, it may misleadingly appear to indicate a pressure drop as a result of ongoing phosgene decomposition, whereas in reality the observed pressure drop is just the result of a lower ambient temperature. In such circumstances, the pressure measured in step d) must be corrected for the influence of the temperature, the temperature in the apparatus at the end of step c), i.e. at the point in time when the predetermined pressure has been established for the first time, being the reference point. This can be easily calculated using the following equation, which, for the purposes of the present invention, is sufficiently accurate:

$$p_{corrected} = (T_{reference}/T_{measured}) \cdot p_{measured}.$$

($p_{corrected}$=pressure corrected for the influence of temperature; $T_{reference}$=the temperature in the apparatus at the end of step c); $T_{measured}$=temperature actually measured in the apparatus; $p_{measured}$=pressure actually measured in the apparatus)

In the case of a downward deviation of the measured pressure from the predetermined pressure by more than 5.0%, the pressure is increased again to the predetermined value by introduction of further gaseous ammonia. When, for example, a pressure of 1.20 bar$_{(abs.)}$ is intended, further ammonia is fed in as soon as the measured pressure drops below a value of 1.14 bar$_{(abs.)}$. A drop in the pressure indicates that the ammonia fed in is reacting with phosgene present. Any temperature control of the apparatus to be cleaned self-evidently also occurs in step d). In practice, it may be difficult to exactly reach again the predetermined value of the pressure. Deviations of up to +2.0% from the predetermined value are not detrimental to the invention, however. In case of the example of a value of the predetermined pressure of 1.20 bar$_{(abs.)}$, this means that ammonia gas is introduced until the pressure rises to a value in the range of from 1.18 bar$_{(abs.)}$ to 1.22 bar$_{(abs.)}$ (2% of 1.20 bar$_{(abs.)}$ being 0.02 bar$_{(abs.)}$).

As soon as the pressure in the apparatus to be cleaned remains within a fluctuation range of ±5.0% around the predetermined value for a period of more than 1.0 hour, preferably at least 12.0 hours, particularly preferably at least 24.0 hours, the ammonia gas source is separated from the apparatus to be cleaned and the shutting-off of at least one discharge conduit is released in order to depressurize the ammonia-containing gas mixture. An inert gas is subsequently passed through the apparatus to be cleaned (step e)) in order to flush out residues of the ammonia-containing gas mixture which are still present. The fluctuation range of ±5.0% is calculated from the predetermined value of the pressure, irrespective of the possible deviations of ±2.0%. In case of the example of a value of the predetermined pressure of 1.20 bar$_{(abs.)}$, this means the pressure is to remain constant in a range of from 1.14 bar$_{(abs.)}$ to 1.26 bar$_{(abs.)}$ (6% of 1.20 bar$_{(abs.)}$ being 0.06 bar$_{(abs.)}$). In practice, the pressure will generally remain at the predetermined value or slightly lower (i.e. up to −5.0%); in the example of a value of the predetermined pressure of 1.20 bar$_{(abs.)}$, this means the pressure will generally remain constant in a range of from 1.14 bar$_{(abs.)}$ to 1.20 bar$_{(abs.)}$.

The introduction of the inert gas can be effected through a separate feed conduit provided only for this purpose or through the same conduit through which the gaseous ammonia was previously passed. The inert gas is passed through the apparatus to be cleaned, i.e. it exits through the at least one opened discharge conduit. A suitable inert gas is, in particular, nitrogen, carbon dioxide or a noble gas such as argon or helium. Preference is given to using nitrogen. The gas mixture leaving the apparatus is preferably fed to an offgas work-up, comprising, for example, an alkaline (such as NaOH) wash step. Ultimately, the exiting gas mixture is, although it has been freed of phosgene, advantageously fed into the abovementioned decomposition of phosgene by means of water over activated carbon since the corresponding piping is present in any case.

Releasing of the shutting-off of the at least one discharge conduit can be preceded by a step of lowering the pressure in the apparatus to be cleaned. This has safety reasons, preventing thereby release of any potentially harmful substance that may in exceptional cases still be present in the apparatus. If this pressure release step is carried out, the pressure is only lowered slightly below atmospheric pressure, preferably to a value of from 900 mbar$_{(abs.)}$ to 1000 mbar$_{(abs.)}$.

In one embodiment of the invention, the apparatus to be cleaned is, after step e), flushed in step f) with an aqueous stream, in particular water or aqueous ammonia, followed by drying the apparatus by passing air or an inert gas through. A suitable inert gas is once again, in particular, nitrogen, carbon dioxide or a noble gas such as argon or helium. Preference is given to using nitrogen. This embodiment is preferred particularly when the apparatus to be cleaned is a reactor filled with activated carbon for preparing phosgene from carbon monoxide and chlorine. In other cases (when the apparatus to be cleaned is, for example, (i) a reactor for reacting phosgene with a reactive starting material, e.g. compounds having two or more phenolic hydroxy groups (to form polycarbonates) and compounds having two or more primary amino groups (to form polyisocyanates), (ii) a work-up apparatus for purifying products which have been prepared using phosgene (in particular a distillation column), or (iii) a peripheral piece of equipment such as a pipe or a container, e.g. a tank), it is often preferable to omit such a flushing step f) and to open the apparatus (when cleaning has been carried out for the purpose of carrying out maintenance or repair work in the apparatus or for the purpose of visual inspection of the apparatus) or to take it into operation again immediately after step e). Here, taking into operation means, in particular, operation of the apparatus for the same purpose as before cleaning.

The method of the invention is particularly suitable for cleaning a reactor filled with activated carbon for preparing phosgene from carbon monoxide and chlorine. Such reactors are, in particular, used as part of production plants for preparing chemical products by reacting phosgene-reactive starting materials with phosgene. Suitable phosgene-reactive starting materials are, in particular, compounds having two or more phenolic hydroxy groups (to form polycarbonates) and compounds having two or more primary amino groups (to form polyisocyanates).

In a preferred embodiment of the invention, the production plant for preparing the chemical product has n reactors for preparing phosgene from carbon monoxide and chlorine which are filled with activated carbon and can be regulated independently of one another, where n is a natural number from 2 to 10, in particular from 2 to 5, with phosgene being prepared from carbon monoxide and chlorine in m reactors, where m is a natural number in the range from 1 to n−1, while the cleaning steps aa), optionally ab), and a) to e) are carried out in at least one reactor. In this way, the activated carbon catalyst in one of the phosgene production reactors can be replaced without operation of the other phosgene production reactors having to be interrupted. Furthermore, this variant of the invention makes it possible, in a particularly preferred embodiment, to feed the carbon monoxide-containing gas leaving the apparatus to be cleaned in step aa) to a process for preparing phosgene from carbon monoxide and chlorine, in particular the preparation of phosgene from carbon monoxide and chlorine in the m reactors.

The method of the invention accordingly allows a particularly advantageous way of carrying out catalyst replacement in a phosgene production reactor. Such a catalyst replacement is carried out by removing the activated carbon and replacing it by fresh activated carbon in a step g) after step e) or, if carried out, after step f).

Overall, the method of the invention is distinguished at least by the following advantages:
  (i) It can be established whether the apparatus to be cleaned is or is not free of phosgene without opening the apparatus and without sampling.
  (ii) The apparatus can be freed of phosgene quickly and thus be used again more quickly.
  (iii) Amounts of wastewater are reduced compared to flushing merely with water or aqueous ammonia, or these disappear completely when after-flushing with water or aqueous ammonia is completely dispensed with, as a result of which complicated drying of the apparatus is then also dispensed with and corrosion is avoided.

EXAMPLES

Example 1 (According to the Invention)

A gas phase phosgenation reactor, after having been emptied, flushed with solvent and in Step ab) purged with nitrogen to remove residual solvent traces, was evacuated to a pressure of 900 mbar$_{(abs.)}$ (Step a)). In a next step, all conduits connected to the apparatus were shut off, with the exception of a feed conduit for ammonia gas (Step b)). Ammonia gas was introduced via this conduit until the pressure in the apparatus rose to the predetermined value of 1.23 bar$_{(abs.)}$ (Step c)). Within a period of time of approximately 29 hours, fresh ammonia gas was introduced five times upon measuring a significant pressure loss (pressure fell to a value as low as 1.12 bar$_{(abs.)}$), thereby bringing the pressure each time to a value of 1.25 bar$_{(abs.)}$ (Step d)). After that the pressure did no longer drop by more than 5% below 1.23 bar$_{(abs.)}$ for a period of 10 hours. After that, the ammonia gas source was separated from the apparatus, the apparatus was evacuated to a pressure of 900 mbar$_{(abs.)}$ and subsequently flushed with nitrogen (Step e)).

The invention claimed is:

1. A method for cleaning a phosgene-conducting apparatus which has at least one feed conduit which can be shut off and at least one discharge conduit which can be shut off, comprising:
   a) lowering the pressure in the apparatus to be cleaned to a value of less than or equal to 900 mbar$_{(abs.)}$;
   b) shutting off all conduits connected to the apparatus to be cleaned with the exception of at least one feed conduit for gaseous ammonia;
   c) introducing gaseous ammonia from an ammonia gas source through the at least one feed conduit which has not been shut off until a predetermined pressure of greater than or equal to 1.01 bar$_{(abs.)}$ is built up in the apparatus to be cleaned;
   d) measuring the pressure in the apparatus to be cleaned, continuously or at intervals of at most 1 hour, and, as soon as the pressure drops by more than 5.0% below the predetermined pressure, returning the pressure to the predetermined pressure or to a value deviating at most ±2.0% from the predetermined pressure by introducing further gaseous ammonia; and
   e) once the pressure in the apparatus to be cleaned remains in a fluctuation range of ±5.0% around the predetermined pressure, for a period of more than 1.0 hour, separating the ammonia gas source from the apparatus to be cleaned, optionally, lowering the pressure in the apparatus, releasing the shutting-off of at least one discharge conduit, followed by passing an inert gas through the apparatus to be cleaned.

2. The method according to claim 1, wherein step a) is preceded by:
   aa) passing carbon monoxide through the apparatus to be cleaned.

3. The method according to claim 2, wherein:
   ab) an inert gas is passed through the apparatus to be cleaned after step aa) and before step a).

4. The method according to claim 1, wherein the apparatus to be cleaned is brought to a temperature in the range from 60.0° C. to 140.0° C. during step a).

5. The method according to claim 1, wherein the apparatus to be cleaned is brought to a temperature in the range from 50.0° C. to 80.0° C. during steps c) and d).

6. The method according to claim 1, wherein step e) is followed by:
   f) passing an aqueous stream through the apparatus to be cleaned, followed by drying by passing air or an inert gas through.

7. The method according to claim 1, wherein the apparatus to be cleaned is, after step e), either opened or taken into operation without an aqueous stream being passed through the apparatus to be cleaned before the opening or the taking into operation.

8. The method according to any of the preceding claims, wherein the apparatus to be cleaned comprises:
   a reactor for preparing phosgene,
   a reactor for reacting phosgene with a reactive starting material,
   a work-up apparatus for purifying products produced using phosgene, or
   peripheral equipment.

9. The method according to claim 8, wherein the apparatus to be cleaned is a reactor filled with activated carbon suitable for preparing phosgene from carbon monoxide and chlorine.

10. The method according to claim 9, wherein the reactor filled with activated carbon suitable for preparing phosgene from carbon monoxide and chlorine is part of a production plant for preparing a chemical product by reacting a phosgene-reactive starting material with phosgene.

11. The method according to claim 10, wherein the phosgene-reactive starting material is a compound having two or more phenolic hydroxy groups or a compound having two or more primary amino groups.

12. The method according to claim 10, wherein the production plant for preparing a chemical product has n reactors suitable for preparing phosgene from carbon monoxide and chlorine which are filled with activated carbon and can be regulated independently of one another, where n is a natural number from 2 to 10, with phosgene being prepared from carbon monoxide and chlorine in m reactors, where m is a natural number in the range from 1 to n−1, while the steps aa), optionally ab), and a) to e) are carried out in at least one reactor.

13. The method according to claim 2, wherein the carbon monoxide-containing gas leaving the apparatus to be cleaned in step aa) is fed to a process for preparing phosgene from carbon monoxide and chlorine.

14. The method according to claim 9, wherein step e) or, if carried out, step f) is followed by:
   g) removing the activated carbon from the reactor and adding fresh activated carbon to the reactor.

15. The method according to claim 1, wherein the predetermined pressure in step c) is in the range from 1.02 bar$_{(abs.)}$ to 4.00 bar$_{(abs.)}$.

16. The method according to claim 2, wherein the apparatus to be cleaned is brought to a temperature in the range from 60.0° C. to 140.0° C. during step aa).

17. The method according to claim 3, wherein the apparatus to be cleaned is brought to a temperature in the range from 60.0° C. to 140.0° C. during step ab).

18. The method according to claim 1, wherein
   ab) an inert gas is passed through the apparatus to be cleaned before step a).

* * * * *